US012359797B2

(12) United States Patent
Zou

(10) Patent No.: US 12,359,797 B2
(45) Date of Patent: Jul. 15, 2025

(54) STRING LAMP STRUCTURE

(71) Applicant: Xinjiang Zou, Meizhou (CN)

(72) Inventor: Xinjiang Zou, Meizhou (CN)

(*) Notice: Subject to any disclaimer, the term of this patent is extended or adjusted under 35 U.S.C. 154(b) by 0 days.

(21) Appl. No.: 18/743,505

(22) Filed: Jun. 14, 2024

(65) Prior Publication Data

US 2025/0020313 A1 Jan. 16, 2025

(30) Foreign Application Priority Data

Jul. 14, 2023 (CN) ......................... 202321846838.3
Aug. 7, 2023 (CN) ......................... 202322104271.9

(51) Int. Cl.
*F21V 21/008* (2006.01)
*F21V 23/00* (2015.01)

(52) U.S. Cl.
CPC .......... *F21V 21/008* (2013.01); *F21V 23/001* (2013.01)

(58) Field of Classification Search
CPC ......................................................... F21S 4/10
See application file for complete search history.

(56) References Cited

U.S. PATENT DOCUMENTS 3,372,362 A * 3/1968 Schick .................. F21V 21/002 439/419
3,601,767 A * 8/1971 Eckles ...................... F21S 4/10 439/419
5,184,890 A * 2/1993 Chen .................. A47G 33/0836 362/438
5,626,415 A * 5/1997 Huang .................... F21V 17/06 362/267
5,702,267 A * 12/1997 Chen .................... H01R 4/2404 439/340
6,305,828 B1 * 10/2001 Huang ................... H01R 33/22 362/396
11,391,421 B2 * 7/2022 Huang .................. F21V 17/101
11,662,085 B1 * 5/2023 Guo ........................ F21V 17/16 362/396
2021/0102687 A1 * 4/2021 Brettmann-Skogg ..... F21S 4/10

OTHER PUBLICATIONS

Universal, Selbstklbend, Mar. 21, 2022, 3Dfindit.com (Year: 2022).*
Universal (Year: 2022).*

* cited by examiner

*Primary Examiner* — Eric T Eide

(57) ABSTRACT

Disclosed is a string lamp structure, including at least one string lamp body, where the string lamp body includes a lamp holder assembly, the lamp holder assembly includes a lamp holder main body and a lamp holder top cover mounted at an upper end portion of the lamp holder main body, a hanging structure is mounted on the lamp holder top cover, the hanging structure includes an arc-shaped bent member connected to the lamp holder top cover and extending in a bent manner in an arc shape, the arc-shaped bent member is vertically arranged, and a plurality of locking protruding portions sequentially arranged at intervals and protruding outwards respectively are arranged at an upper end portion of the arc-shaped bent member; and a top cover protruding portion located on one side of the arc-shaped bent member and protruding upwards is arranged on the lamp holder top cover.

12 Claims, 10 Drawing Sheets

STRING LAMP STRUCTURE

TECHNICAL FIELD

The present application relates to the technical field of string lamps, in particular to a string lamp structure.

BACKGROUND

There is a Chinese utility model patent with the patent No. being ZL 202320325336.X and the patent title being a novel RGB string lamp structure. The novel RGB string lamp structure includes a power line, the power line is provided with string lamp bodies arranged in sequence, each string lamp body includes a lamp holder portion and a bulb portion, and the power line penetrates through the interior of the lamp holder portion and is electrically connected with the bulb portion. The bulb portion includes a power connection copper head and an RGB light source (a lamp bead), the RGB light source is provided with three light source pins, the power connection copper head is respectively provided with a copper head power connection portion corresponding to each light source pin of the RGB light source, and each light source pin of the RGB light source makes contact with and is electrically connected with the corresponding copper head power connection portion of the power connection copper head; metal terminals corresponding to the copper head power connection portions of the power connection copper head are arranged in the lamp holder portion, the power line is of a three-parallel-line structure and includes three power supply branch lines, the metal terminals are electrically connected with line cores of the corresponding power supply branch lines respectively, and the copper head power connection portions of the power connection copper head make contact with and are electrically connected with the corresponding metal terminals respectively. In addition, the bulb portion further includes a light guide column, a core portion of the light guide column is provided with a light source accommodating cavity with an upward opening, an end sealing rubber member is arranged at the opening of an upper end of the light source accommodating cavity, the end sealing rubber member is of a rubber member structure formed by a gluing technology or is of a rubber plug structure, and the RGB light source is embedded in the light source accommodating cavity and is fixed to the light guide column by means of the end sealing rubber member.

It should be noted that the novel RGB string lamp structure has the following defects: specifically, lamp bead portions need to be electrically connected to copper heads firstly, then the copper heads are electrically connected to the power line by means of the metal terminals, and the lamp beads need to be fixed to light guide members by means of the end sealing rubber members, so that the structure is complex and inconvenient to assemble.

SUMMARY

The present application aims to provide a string lamp structure to overcome the defects in the prior art. The string lamp structure is novel in design, simple in structure and convenient to assemble.

In order to achieve the above purpose, the present application is achieved by means of the following technical solution.

The string lamp structure comprises at least one string lamp body, where the string lamp body comprises a lamp holder assembly, the lamp holder assembly comprises a lamp holder main body and a lamp holder top cover mounted at an upper end portion of the lamp holder main body, a hanging structure is mounted on the lamp holder top cover, the hanging structure comprises an arc-shaped bent member connected to the lamp holder top cover and extending in a bent manner in an arc shape, the arc-shaped bent member is vertically arranged, and a plurality of locking protruding portions sequentially arranged at intervals and protruding outwards respectively are arranged at an upper end portion of the arc-shaped bent member; a top cover protruding portion located on one side of the arc-shaped bent member and protruding upwards is arranged on the lamp holder top cover, and a lock tongue protruding towards a side of the arc-shaped bent member is arranged at an upper end portion of the top cover protruding portion; and during use, one of the locking protruding portions of the arc-shaped bent member is selected to be snap-fitted with the lock tongue of the top cover protruding portion.

A bent member base protruding upwards is arranged on the lamp holder top cover corresponding to the arc-shaped bent member, and the arc-shaped bent member is connected to an upper end portion of the bent member base.

The lamp holder top cover, the arc-shaped bent member and the bent member base are of an integrated structure.

The three locking protruding portions sequentially arranged at intervals and protruding outwards respectively are arranged at the upper end portion of the arc-shaped bent member.

A pressing protruding portion protruding outwards is arranged on the arc-shaped bent member.

A hanging hook is arranged at an edge portion of the lamp holder top cover.

The lamp holder top cover is snap-fitted with the upper end portion of the lamp holder main body.

A power line passage through which a string lamp power line passes is formed between the lamp holder main body and the lamp holder top cover.

The string lamp body further comprises a lamp bead and a light-transmitting lamp housing, a lamp housing connection portion is arranged on the lamp holder main body, the light-transmitting lamp housing is connected to the lamp housing connection portion of the lamp holder main body, the lamp bead is mounted on the string lamp power line, and the lamp bead is electrically connected to the string lamp power line;

a main body core cylinder is arranged on an inner side of the lamp housing connection portion of the lamp holder main body, a vertically penetrating line passage is formed in a core portion of the main body core cylinder, a lower end portion of the main body core cylinder is a conical portion with a wide top and a narrow bottom, and a plurality of radially penetrating vertical grooves with downward openings are formed in a side wall of the conical portion; and the string lamp power line passes through the line passage of the main body core cylinder from top to bottom, the lamp bead is located below the main body core cylinder, and the lamp bead is blocked and limited by means of a lower surface of the conical portion of the main body core cylinder.

An external thread is arranged at an upper end portion of the light-transmitting lamp housing, an internal thread is arranged at the lamp housing connection portion of the lamp holder main body, and the external thread of the light-transmitting lamp housing is in threaded connection with the internal thread of the lamp housing connection portion.

A light guide member is mounted inside the light-transmitting lamp housing, and the light guide member is sleeved on a periphery of the main body core cylinder; and a limiting shoulder is arranged at an upper end portion of the light guide member, and the limiting shoulder of the light guide member overlaps against an upper end portion of the light-transmitting lamp housing.

The present application has the following beneficial effects: the string lamp structure in the present application comprises at least one string lamp body, where the string lamp body comprises a lamp holder assembly, the lamp holder assembly comprises a lamp holder main body and a lamp holder top cover mounted at an upper end portion of the lamp holder main body, a hanging structure is mounted on the lamp holder top cover, the hanging structure comprises an arc-shaped bent member connected to the lamp holder top cover and extending in a bent manner in an arc shape, the arc-shaped bent member is vertically arranged, and a plurality of locking protruding portions sequentially arranged at intervals and protruding outwards respectively are arranged at an upper end portion of the arc-shaped bent member; a top cover protruding portion located on one side of the arc-shaped bent member and protruding upwards is arranged on the lamp holder top cover, and a lock tongue protruding towards a side of the arc-shaped bent member is arranged at an upper end portion of the top cover protruding portion; and during use, one of the locking protruding portions of the arc-shaped bent member is selected to be snap-fitted with the lock tongue of the top cover protruding portion. By means of the above structural design, the present application has the advantages of novel structural design, high adaptability and high hanging stability and reliability.

BRIEF DESCRIPTION OF DRAWINGS

The present application is further explained below by means of the accompanying drawings. However, embodiments in the accompanying drawings do not constitute any limitation on the present application.

FIG. 1-FIG. 10 include:

Figure 1:
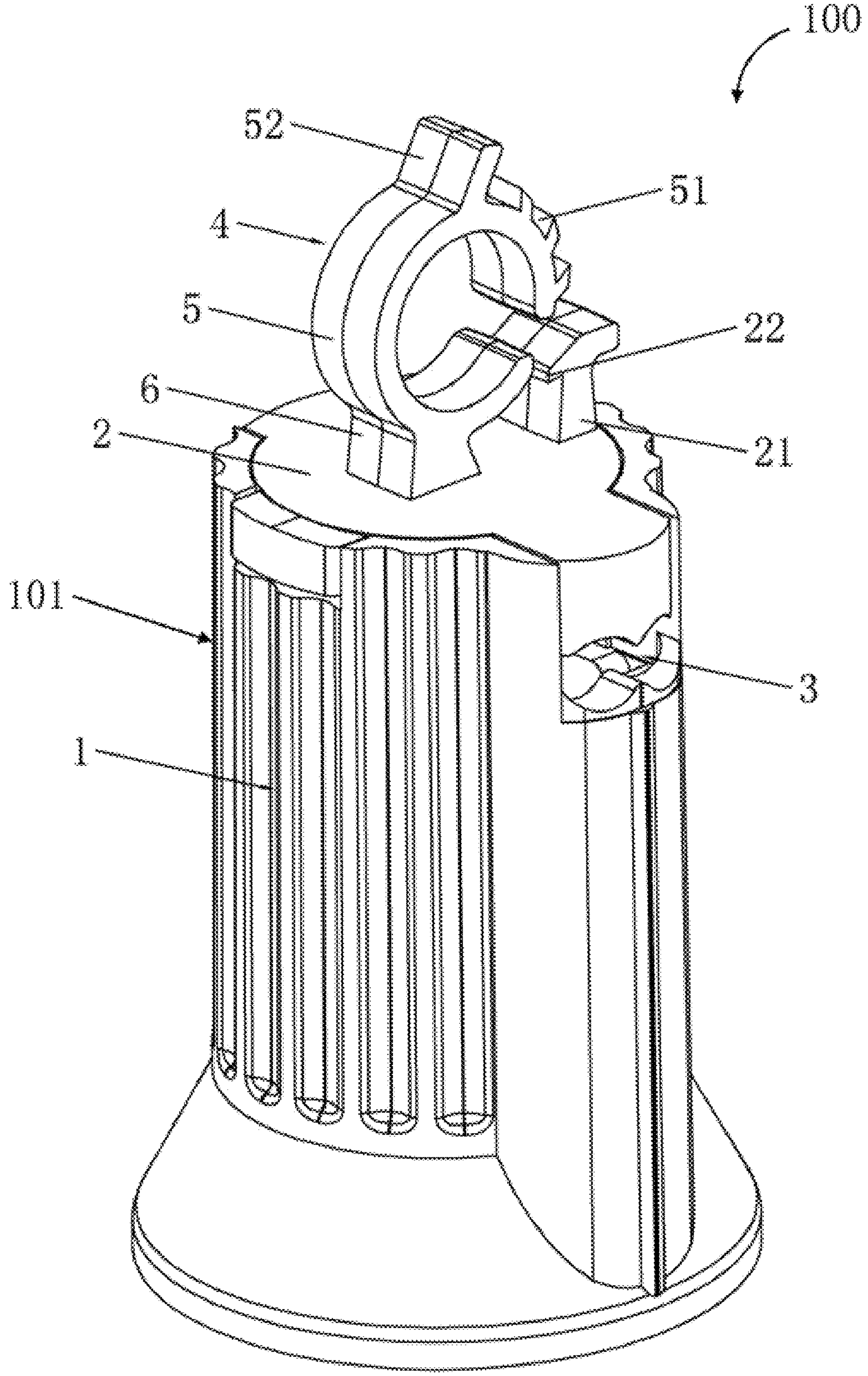
FIG. 1 is a structural schematic diagram of the present application.
Figure 2:
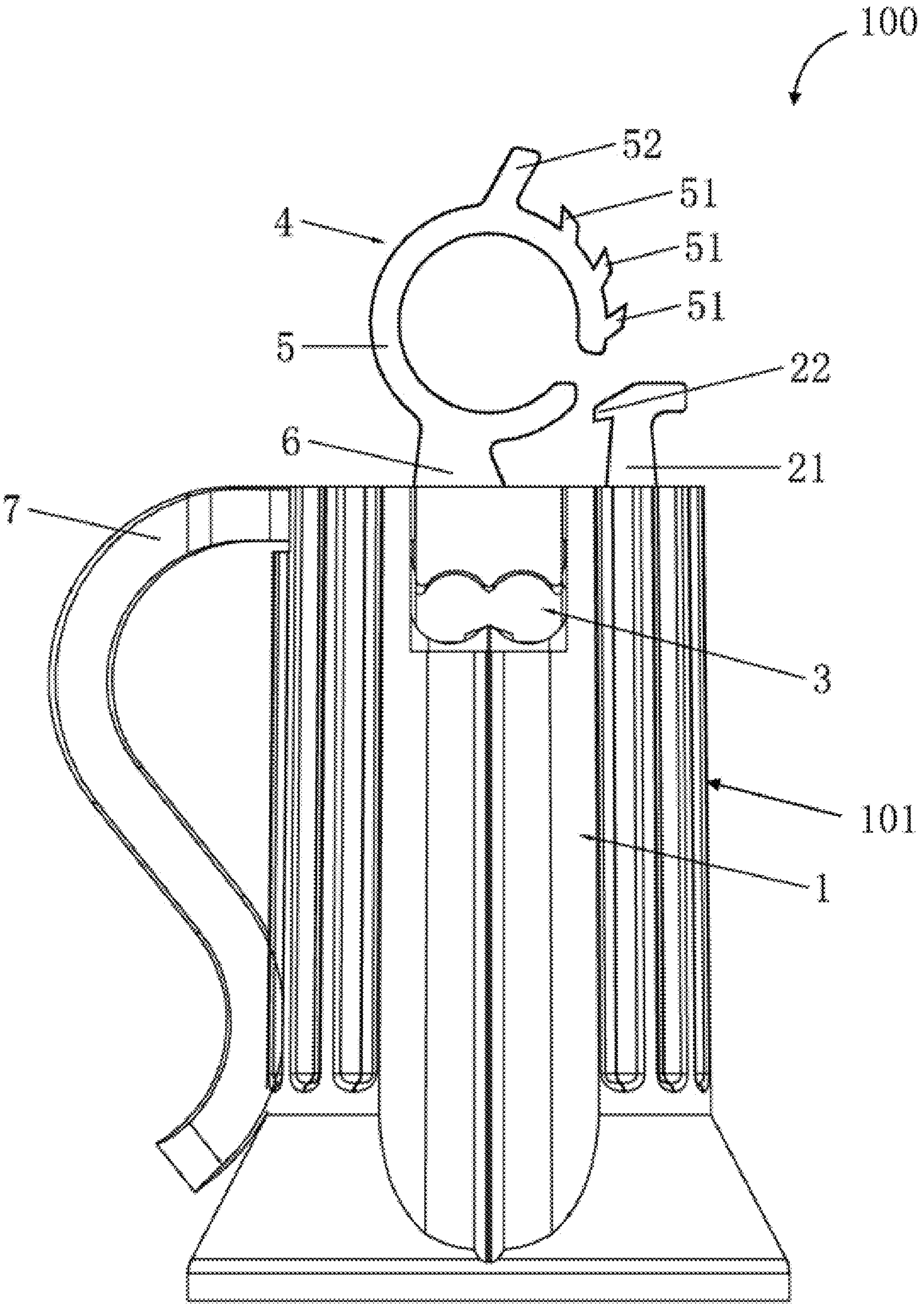
FIG. 2 is a structural schematic diagram of another embodiment of the present application.
Figure 3:
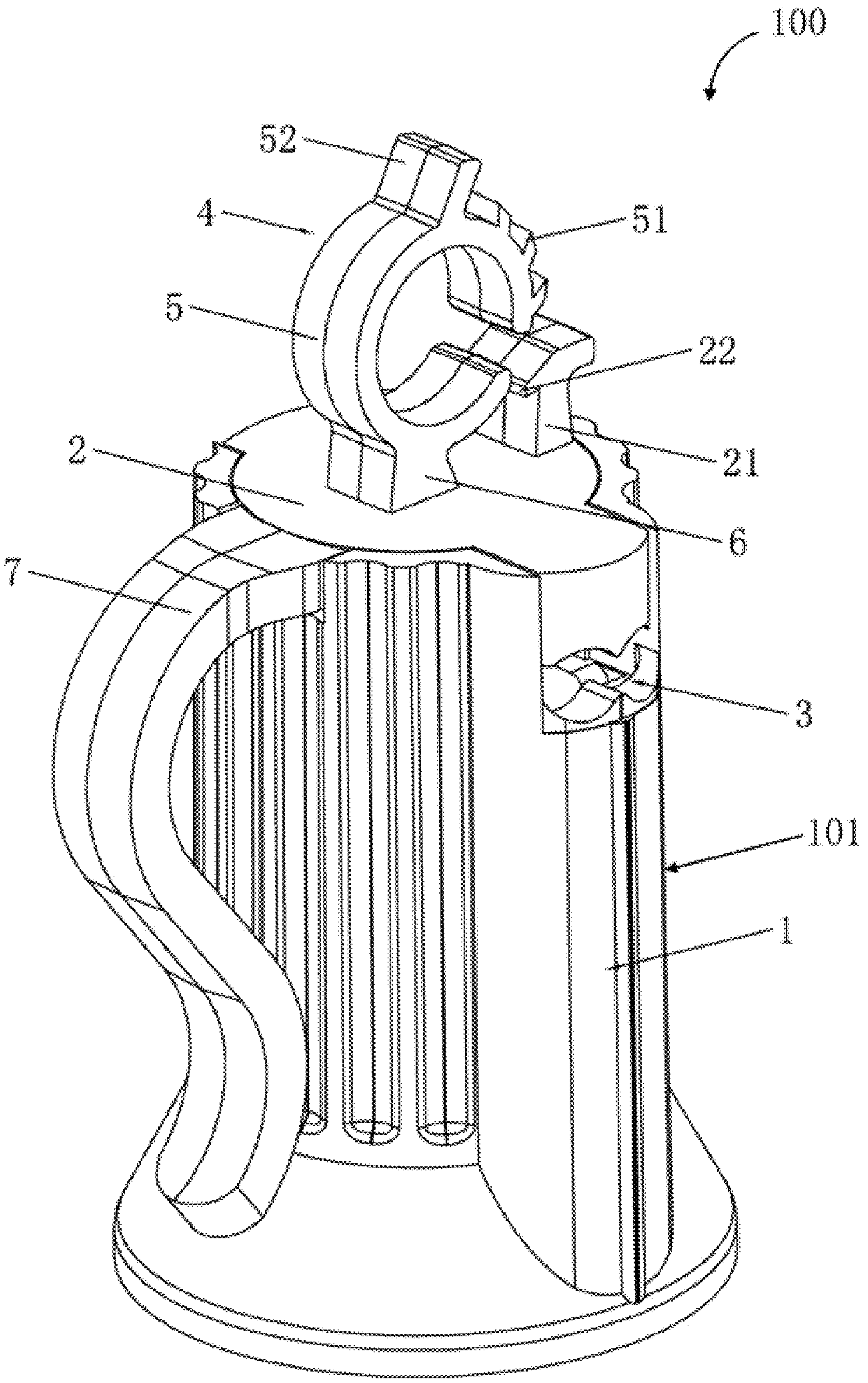
FIG. 3 is a breakdown schematic diagram of FIG. 2.
Figure 4:
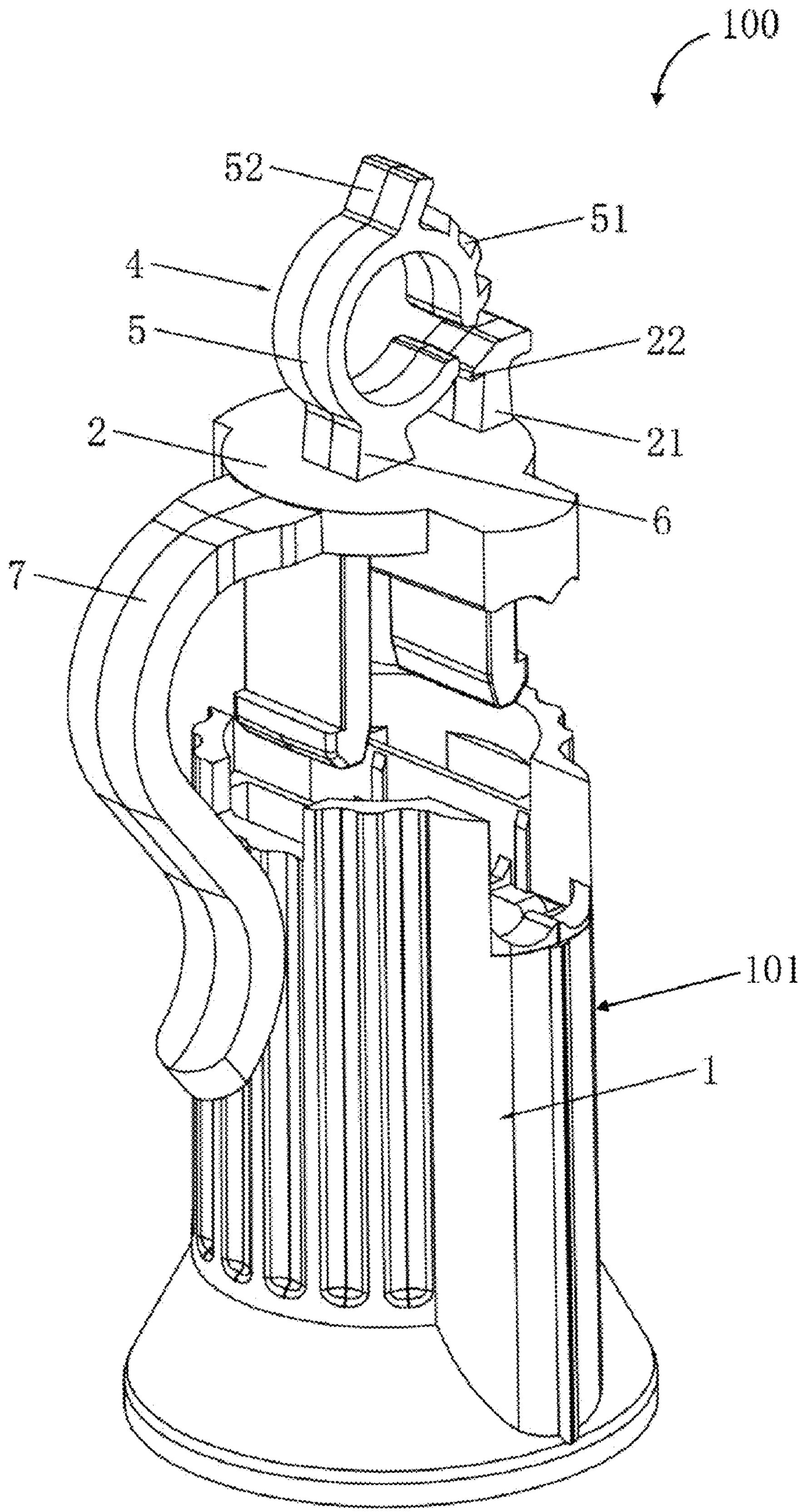
FIG. 4 is a sectional schematic diagram of another embodiment of the present application.
Figure 5:
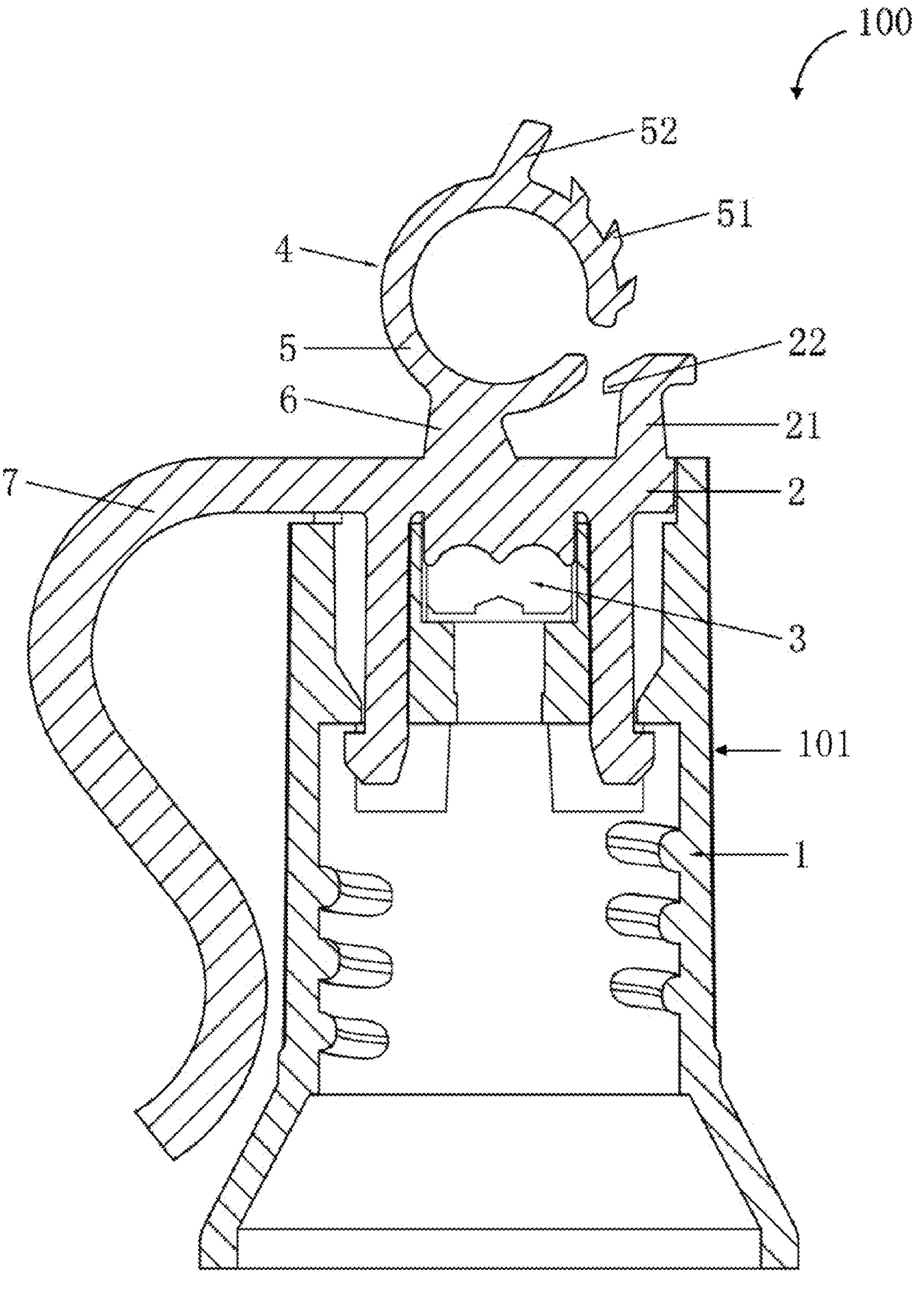
FIG. 5 is a structural schematic diagram of another embodiment of the present application at another viewing angle.
Figure 6:
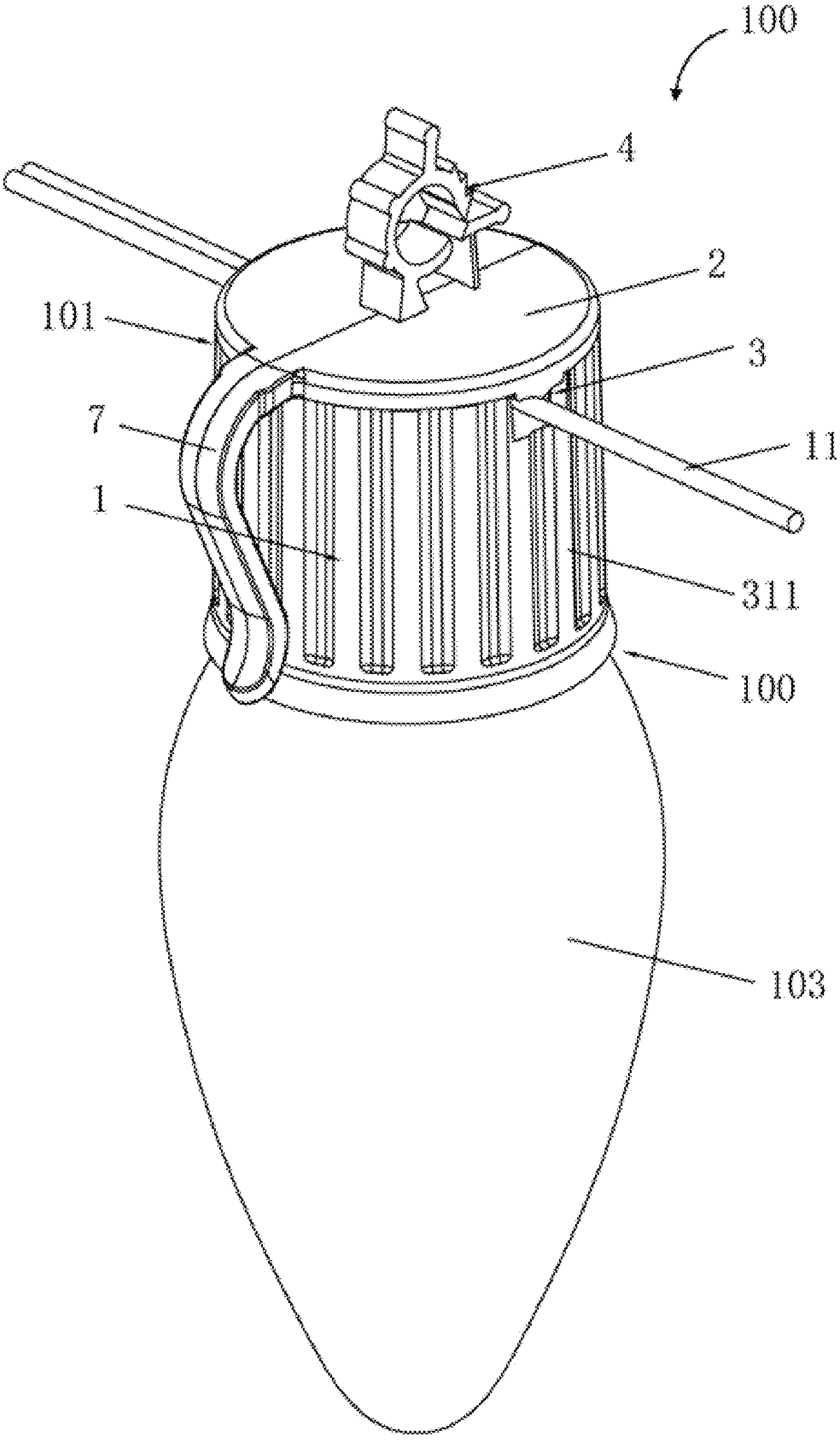
FIG. 6 is a structural schematic diagram of another embodiment of the present application.
Figure 7:
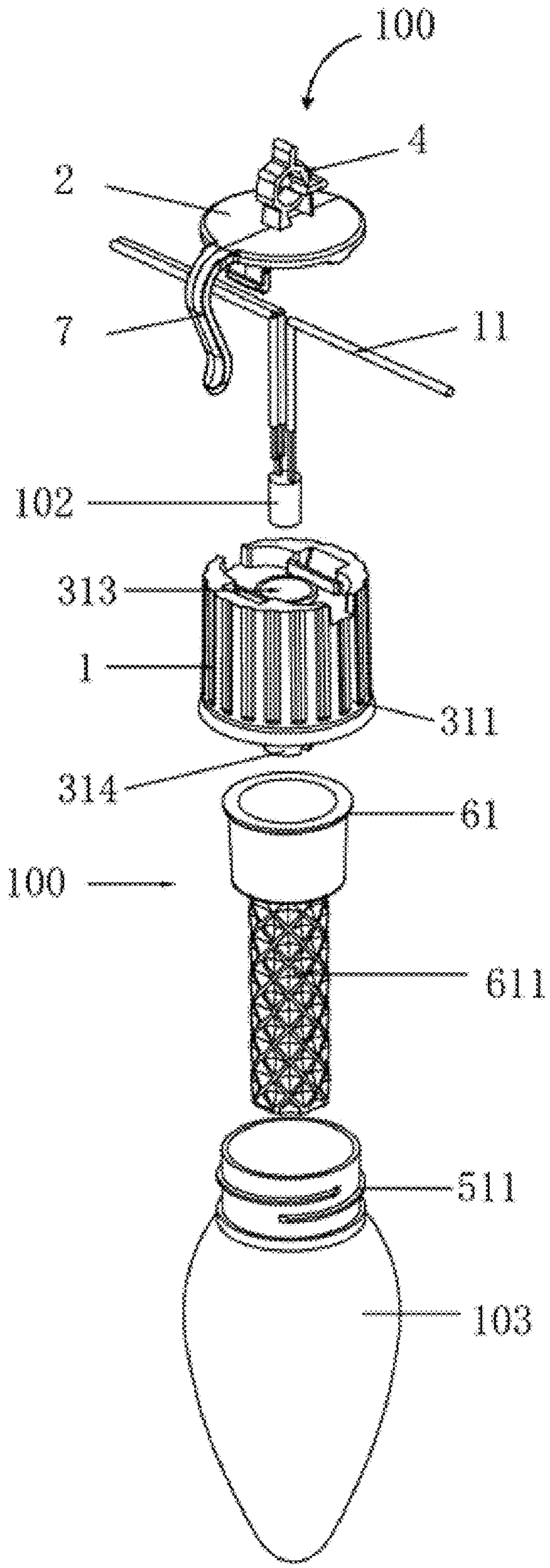
FIG. 7 is a breakdown schematic diagram of FIG. 6.

100—string lamp body; 101—lamp holder assembly; 102—lamp bead; 103—light-transmitting lamp housing; 1—lamp holder main body; 11—string lamp power line; 2—lamp holder top cover; 21—top cover protruding portion; 22—lock tongue; 3—power line passage; 311—lamp housing connection portion; 3111—internal thread; 312—main body core cylinder; 313—line passage; 314—conical portion; 315—vertical groove; 4—hanging structure; 5—arc-shaped bent member; 51—locking protruding portion; 511—external thread; 52—pressing protruding portion; 6—bent member base; 61—limiting shoulder; 611—light guide member; and 7—hanging hook.

DETAILED DESCRIPTION OF THE EMBODIMENTS

The present application is explained below in conjunction with particular embodiments.

Embodiment I: as shown in FIG. 1 to FIG. 10, a string lamp structure includes at least one string lamp body 100, where the string lamp body 100 includes a lamp holder assembly 101, the lamp holder assembly 101 includes a lamp holder main body 1 and a lamp holder top cover 2 mounted at an upper end portion of the lamp holder main body, and a hanging structure 4 is mounted on the lamp holder top cover 2. It should be explained that the lamp holder top cover 2 in Embodiment I is snap-fitted with the upper end portion of the lamp holder main body 1.

Specifically, the hanging structure 4 includes an arc-shaped bent member 5 connected to the lamp holder top cover 2 and extending in a bent manner in an arc shape, the arc-shaped bent member 5 is vertically arranged, and a plurality of locking protruding portions 51 sequentially arranged at intervals and protruding outwards respectively are arranged at an upper end portion of the arc-shaped bent member 5. It should be explained that as shown in FIG. 1 to FIG. 10, the three locking protruding portions 51 sequentially arranged at intervals and protruding outwards respectively are arranged at the upper end portion of the arc-shaped bent member 5; and of course, the number does not constitute the limitation on Embodiment I, that is, the locking protruding portions 51 in other numbers can also be arranged on the arc-shaped bent member 5.

Further, a top cover protruding portion 21 located on one side of the arc-shaped bent member 5 and protruding upwards is arranged on the lamp holder top cover 2, and a lock tongue 22 protruding towards a side of the arc-shaped bent member 5 is arranged at an upper end portion of the top cover protruding portion 21; and during use, one of the locking protruding portions 51 of the arc-shaped bent member 5 is selected to be snap-fitted with the lock tongue 22 of the top cover protruding portion 21. The lock tongue 22 is a fixed lock tongue.

It should be noted that the string lamp structure in Embodiment I serves as a lamp holder portion of a string lamp, when the string lamp is hung on a corresponding connection line, according to the thickness of the connection line, a user can select the locking protruding portion 51 at a corresponding position to be snap-fitted with the lock tongue 22 of the top cover protruding portion 21, so that the arc-shaped bent member 5 tightly holds the connection line, and the lamp holder can be stably and reliably hung on the connection line.

In summary, by means of the above structural design, compared with the prior art, the string lamp structure in Embodiment I has the advantages of novel structural design, high adaptability and high hanging stability and reliability.

Embodiment II: as shown in FIG. 1 to FIG. 10, the difference between Embodiment II and Embodiment I lies in that the arc-shaped bent member 5 in Embodiment II can be connected to the lamp holder top cover 2 in the following manner: specifically, a bent member base 6 protruding upwards is arranged on the lamp holder top cover 2 corresponding to the arc-shaped bent member 5, and the arc-shaped bent member 5 is connected to an upper end portion of the bent member base 6. The lamp holder top cover 2, the arc-shaped bent member 5 and the bent member base 6 are of an integrated structure.

Embodiment III: as shown in FIG. 1 to FIG. 10, the difference between Embodiment III and Embodiment I lies in that a pressing protruding portion 52 protruding outwards is arranged on the arc-shaped bent member 5.

When one locking protruding portion 51 is snap-fitted with the lock tongue 22 of the top cover protruding portion 21, the user can press the pressing protruding portion 52 of the arc-shaped bent member 5 to enable the arc-shaped bent member 5 to be bent and deformed adaptively.

Embodiment IV: as shown in FIG. 2 to FIG. 10, the difference between Embodiment IV and Embodiment I lies in that a hanging hook 7 is arranged at an edge portion of the lamp holder top cover 2.

For the hanging hook 7 in Embodiment IV, the hanging function of the lamp holder can be further expanded.

Embodiment V: as shown in FIG. 1 to FIG. 10, the difference between Embodiment V and Embodiment I lies in that a power line passage through which a string lamp power line 11 passes is formed between the lamp holder main body 1 and the lamp holder top cover 2. The string lamp power line 11 can also be called a power supply line, and the power line passage 3 can also be called an electric wire passage.

Embodiment VI: as shown in FIG. 6 to FIG. 10, the difference between Embodiment VI and Embodiment I lies in that the string lamp body 100 further includes a lamp bead 102 and a light-transmitting lamp housing 103, a lamp housing connection portion 311 is arranged on the lamp holder main body 1, the light-transmitting lamp housing 103 is connected to the lamp housing connection portion 311 of the lamp holder main body 1, the lamp bead 102 is mounted on the string lamp power line 11, and the lamp bead 102 is electrically connected to the string lamp power line 11;

a main body core cylinder 312 is arranged on an inner side of the lamp housing connection portion 311 of the lamp holder main body, a vertically penetrating line passage 313 is formed in a core portion of the main body core cylinder 312, a lower end portion of the main body core cylinder 312 is a conical portion 314 with a wide top and a narrow bottom, and a plurality of radially penetrating vertical grooves 315 with downward openings are formed in a side wall of the conical portion 314; and the string lamp power line 11 passes through the line passage 313 of the main body core cylinder 312 from top to bottom, the lamp bead 102 is located below the main body core cylinder 312, and the lamp bead 102 is blocked and limited by means of a lower surface of the conical portion 314 of the main body core cylinder 312.

It can be understood that the string lamp structure includes at least one string lamp body 100, each string lamp body 100 includes the lamp holder assembly 101, the lamp bead 102 and the light-transmitting lamp housing 103, each lamp holder assembly 101 includes the lamp holder main body 1, each lamp holder main body 1 is provided with the lamp housing connection portion 311, and each light-transmitting lamp housing 103 is connected to the lamp housing connection portion 311 of the corresponding lamp holder main body 1.

Specifically, as shown in FIG. 1 to FIG. 10, each lamp holder assembly 101 further includes the lamp holder top cover 2 snap-fitted with the upper end portion of the lamp holder main body 1, and the power line passage 3 through which the string lamp power line 11 passes is formed between the lamp holder top cover 2 and the lamp holder main body 1.

Further, the lamp beads 102 are sequentially mounted on the string lamp power line 11, and the lamp beads 102 are respectively electrically connected to the string lamp power line 11.

Furthermore, as shown in FIG. 6 to FIG. 10, the main body core cylinder 312 is arranged on the inner side of the lamp housing connection portion 311 of each lamp holder main body, the vertically penetrating line passage 313 is formed in the core portion of the main body core cylinder 312, the lower end portion of the main body core cylinder 312 is the conical portion 314 with the wide top and the narrow bottom, and the plurality of radially penetrating vertical grooves 315 with the downward openings are formed in the side wall of the conical portion 314.

Besides, the string lamp power line 11 passes through the line passages 313 of the main body core cylinders 312 from top to bottom, the lamp beads 102 are respectively located below the corresponding main body core cylinders 312, and the lamp beads 102 are respectively blocked and limited by means of the lower surfaces of the conical portions 314 of the corresponding main body core cylinders 312.

In addition, an external thread 511 is arranged at an upper end portion of each light-transmitting lamp housing 103, an internal thread 3111 is arranged at the lamp housing connection portion 311 of each lamp holder main body 1, and the external thread 511 of the light-transmitting lamp housing 103 is in threaded connection with the internal thread 3111 of the lamp housing connection portion 311.

During the assembly process of the string lamp structure in Embodiment VI, the string lamp power line 11 passes through the line passages 313 of the main body core cylinders 312 from top to bottom, the lamp beads 102 pass through the line passages 313, during the process of the lamp beads 102 passing through the conical portions 314 of the main body core cylinders 312, the conical portions 314 are expanded and deformed outwards firstly such that the lamp beads 102 can smoothly pass through the conical portions 314, after the lamp beads 102 reach below the conical portions 314, the conical portions 314 are restored, and then the lower end diameters of the conical portions 314 are smaller than outer diameters of the lamp beads 102, that is, the lamp beads 102 are blocked and limited by the lower surfaces of the conical portions 314; after the lamp beads 102 are mounted on the lamp holder main bodies 1, the light-transmitting lamp housings 103 are mounted at the lamp housing connection portions 311 and are snap-fitted with the lamp holder top covers 2, then the entire string lamp bodies 100 can be assembled, and the assembly process is convenient and quick.

Besides, compared with string lamps in the prior art, the lamp beads 102 are not required to be fixed by means of end sealing rubber members, and the lamp beads 102 are not required to be electrically connected to the string lamp power line 11 by means of corresponding metal terminals, so that the entire structure in Embodiment I is simpler.

In summary, by means of the above structural design, the string lamp structure in Embodiment VI has the advantages of novel design, simple structure and convenience in assembly.

Figure 8:
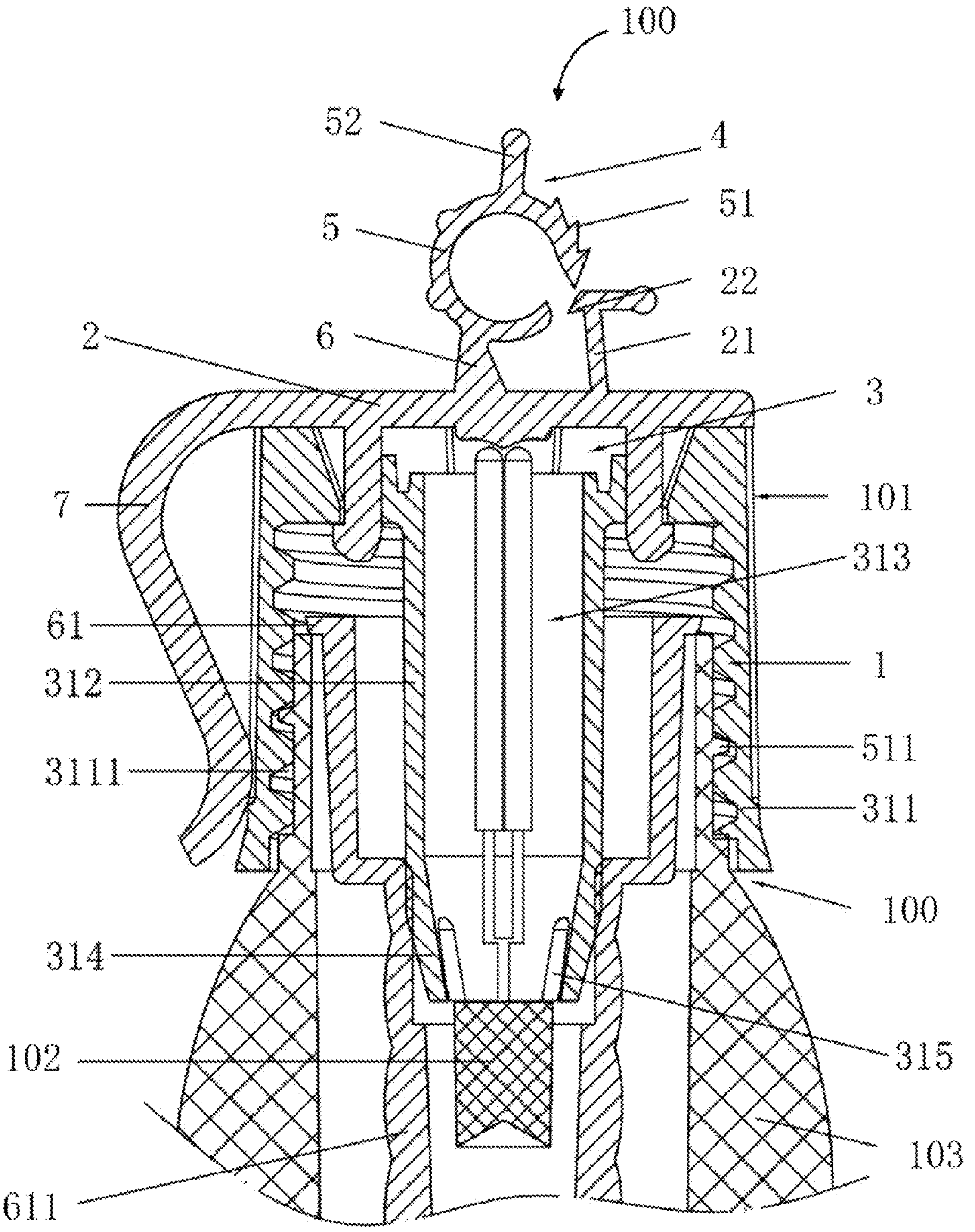
FIG. 8 is a sectional schematic diagram of another embodiment of the present application.
Figure 9:
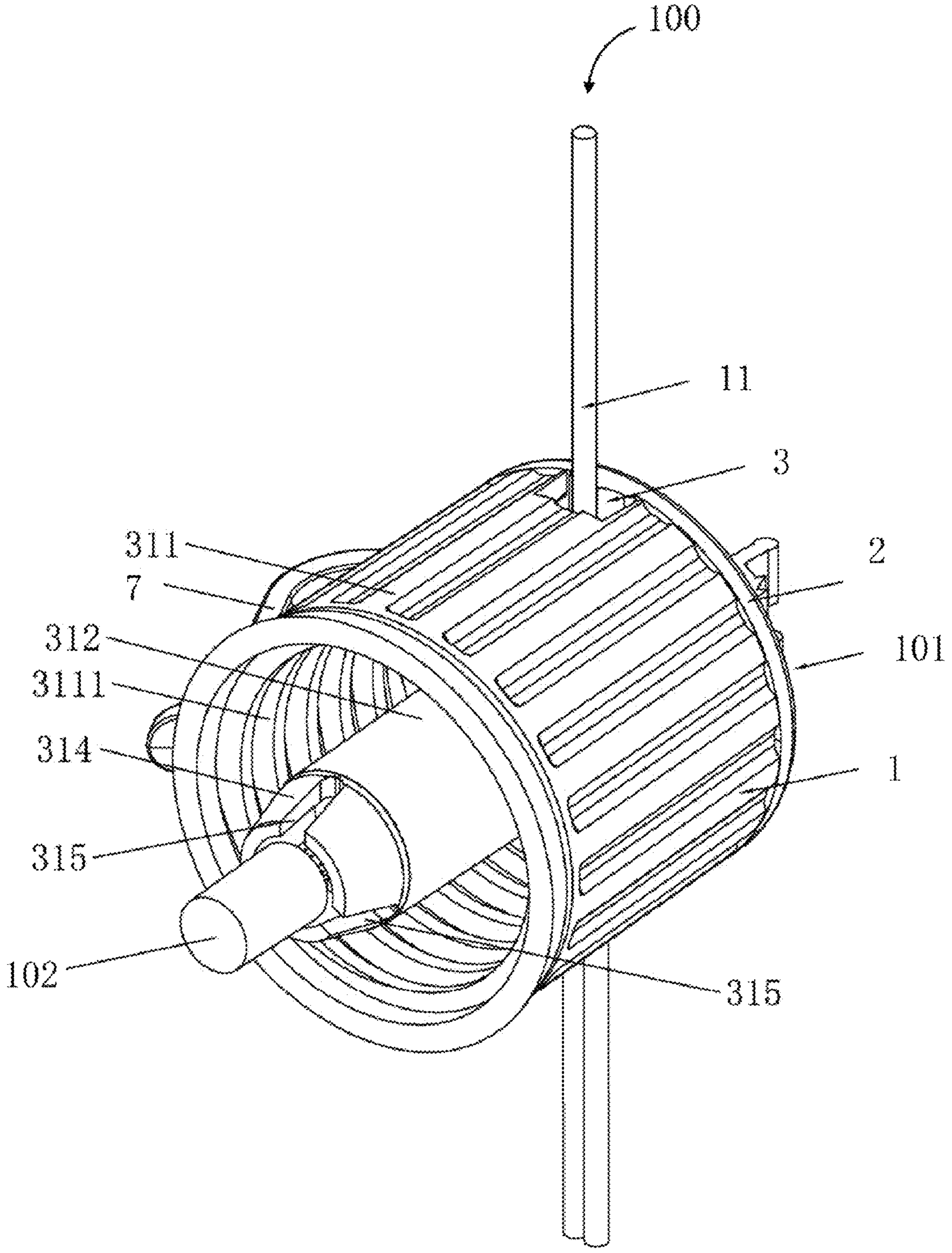
FIG. 9 is a local structural schematic diagram of another embodiment of the present application.
Figure 10:
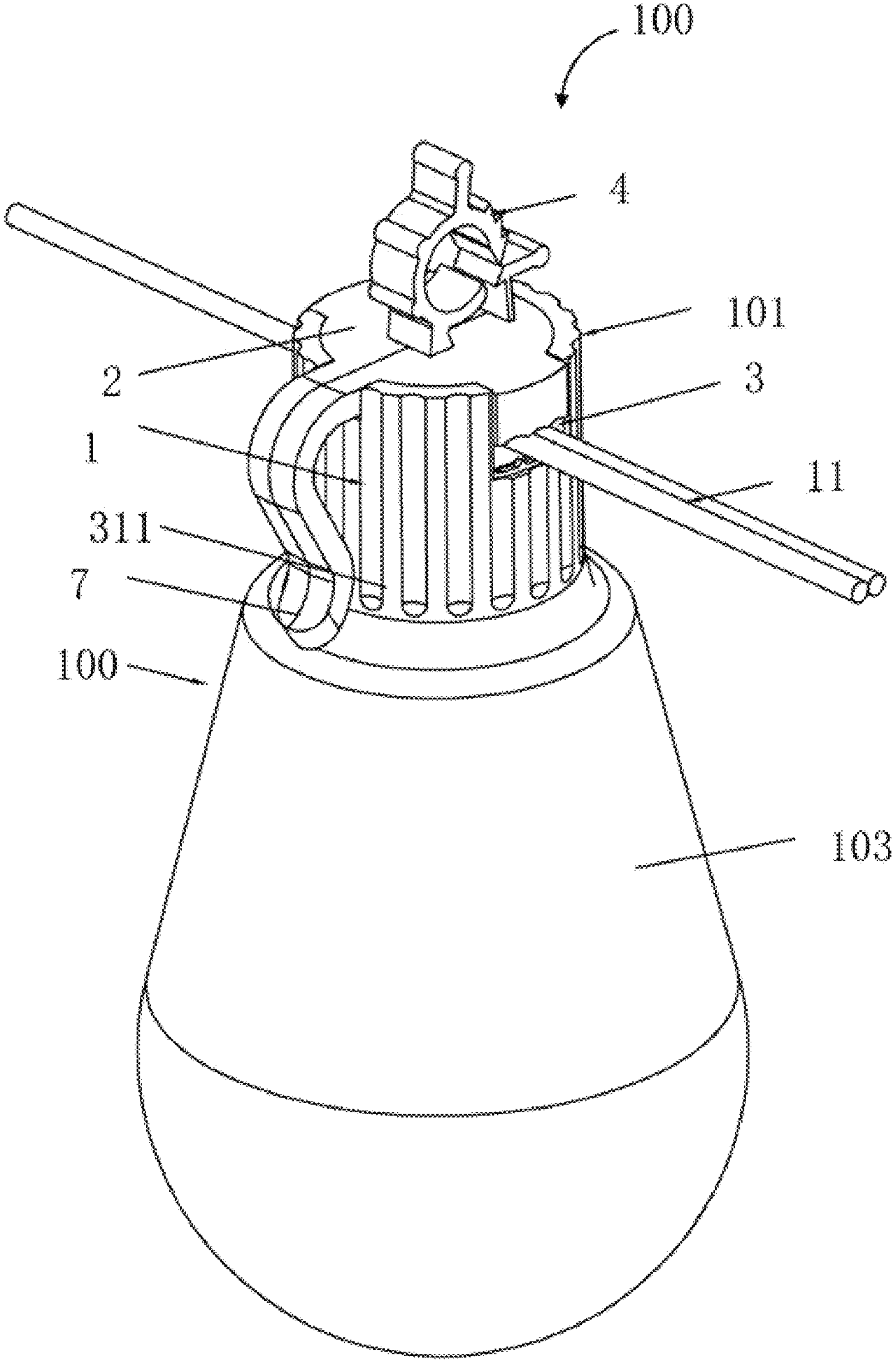
FIG. 10 is a structural schematic diagram of another embodiment of the present application.

Embodiment VII: as shown in FIG. 1 and FIG. 8, the difference between Embodiment VII and Embodiment I lies in that a light guide member 6 is mounted inside the light-transmitting lamp housing 103, and the light guide member 6 is sleeved on a periphery of the main body core cylinder 312.

A limiting shoulder 61 is arranged an upper end portion of the light guide member 6, and the limiting shoulder 61 of the light guide member 6 overlaps against an upper end portion of the light-transmitting lamp housing 103.

Embodiment VIII: the difference between Embodiment VIII and Embodiment I lies in that a wire placement groove having an upward opening and completely penetrating through left and right sides is formed in the middle of a main body mounting portion of the lamp holder main body 1, a first mounting groove and a second mounting groove which are in communication with a bulb mounting hole respectively are formed in a bottom surface of the wire placement groove, the first mounting groove is spaced apart from the second mounting groove, a first conductive elastic sheet is embedded in the first mounting groove, a second conductive elastic sheet is embedded in the second mounting groove, and lower end portions of the first conductive elastic sheet and the second conductive elastic sheet respectively extend into the bulb mounting hole; a first elastic sheet sharp head protruding upwards and extending into the wire placement groove is arranged at an upper end portion of the first conductive elastic sheet, and a second elastic sheet sharp head protruding upwards and extending into the wire placement groove is arranged at an upper end portion of the second conductive elastic sheet; and a top cover wire pressing portion protruding downwards and aligned with the wire placement groove is arranged in the middle of the lamp holder top cover 2, and the top cover wire pressing portion and the lamp holder top cover 2 are of an integrated structure.

When the string lamp structure is connected to wires, the two wires are positioned and placed in the wire placement groove of the main body mounting portion, the top cover wire pressing portion of the lamp holder top cover 2 abuts against the two wires downwards, the first elastic sheet sharp head of the first conductive elastic sheet pierces an insulation layer of one of the wires and is in electric contact with a wire core of the wire, and the second elastic sheet sharp head of the second conductive elastic sheet pierces an insulation layer of the other wire and is in electric contact with a wire core of the wire.

The above content is merely preferred embodiments of the present application. For those of ordinary skill in the art, on the basis of the ideas of the present application, the particular embodiments and the application scope will be changed. The content of the specification should not be construed as limitations on the present application.

What is claimed is:

1. A string lamp structure, comprising at least one string lamp body, wherein the string lamp body comprises a lamp holder assembly, the lamp holder assembly comprises a lamp holder main body and a lamp holder top cover mounted at an upper end portion of the lamp holder main body, a hanging structure is mounted on the lamp holder top cover, the hanging structure comprises an arc-shaped bent member connected to the lamp holder top cover and extending in a bent manner in an arc shape, the arc-shaped bent member is vertically arranged, and a plurality of locking protruding portions sequentially arranged at intervals and protruding outwards respectively are arranged at an upper end portion of the arc-shaped bent member;

a top cover protruding portion located on one side of the arc-shaped bent member and protruding upwards is arranged on the lamp holder top cover, and a lock tongue protruding towards a side of the arc-shaped bent member is arranged at an upper end portion of the top cover protruding portion;

during use, one of the locking protruding portions of the arc-shaped bent member is selected to be snap-fitted with the lock tongue of the top cover protruding portion; and a lamp housing connection portion is arranged on the lamp holder main body, a main body core cylinder is arranged on an inner side of the lamp housing connection portion, a lower end portion of the main body core cylinder is a conical portion, and a plurality of radially penetrating vertical grooves with downward openings are formed in a side wall of the conical portion.

2. The string lamp structure according to claim 1, wherein a bent member base protruding upwards is arranged on the lamp holder top cover corresponding to the arc-shaped bent member, and the arc-shaped bent member is connected to an upper end portion of the bent member base.

3. The string lamp structure according to claim 2, wherein the lamp holder top cover, the arc-shaped bent member and the bent member base are of an integrated structure.

4. The string lamp structure according to claim 1, wherein a number of the locking protruding portions is three.

5. The string lamp structure according to claim 1, wherein a pressing protruding portion protruding outwards is arranged on the arc-shaped bent member.

6. The string lamp structure according to claim 1, wherein a hanging hook is arranged at an edge portion of the lamp holder top cover.

7. The string lamp structure according to claim 1, wherein the lamp holder top cover is snap-fitted with the upper end portion of the lamp holder main body.

8. The string lamp structure according to claim 1, wherein a power line passage through which a string lamp power line passes is formed between the lamp holder main body and the lamp holder top cover.

9. The string lamp structure according to claim 1, wherein the string lamp body further comprises a lamp bead and a light-transmitting lamp housing, the light-transmitting lamp housing is connected to the lamp housing connection portion of the lamp holder main body, the lamp bead is mounted on a string lamp power line, and the lamp bead is electrically connected to the string lamp power line;

a vertically penetrating line passage is formed in a core portion of the main body core cylinder; and the string lamp power line passes through the line passage of the main body core cylinder from top to bottom, the lamp bead is located below the main body core cylinder, and the lamp bead is blocked and limited by means of a lower surface of the conical portion of the main body core cylinder.

10. The string lamp structure according to claim 9, wherein an external thread is arranged at an upper end portion of the light-transmitting lamp housing, an internal thread is arranged at the lamp housing connection portion of the lamp holder main body, and the external thread of the light-transmitting lamp housing is in threaded connection with the internal thread of the lamp housing connection portion.

11. The string lamp structure according to claim 9, wherein a light guide member is mounted inside the light-transmitting lamp housing, and the light guide member is sleeved on a periphery of the main body core cylinder; and a limiting shoulder is arranged an upper end portion of the light guide member, and the limiting shoulder of the light guide member overlaps against an upper end portion of the light-transmitting lamp housing.

12. The string lamp structure according to claim 9, wherein the lamp bead is capable of passing through the conical portion of the main body core cylinder, when the lamp bead passes through the conical portion, the conical portion is expanded and deformed outwards;

when the lamp bead reaches below the conical portion, the conical portion is restored, such that the lamp bead is blocked and limited by means of the lower surface of the conical portion.

* * * * *